Oct. 15, 1963 J. BOEHM 3,106,868
CAM PRODUCING APPARATUS
Filed Oct. 14, 1960 2 Sheets-Sheet 1
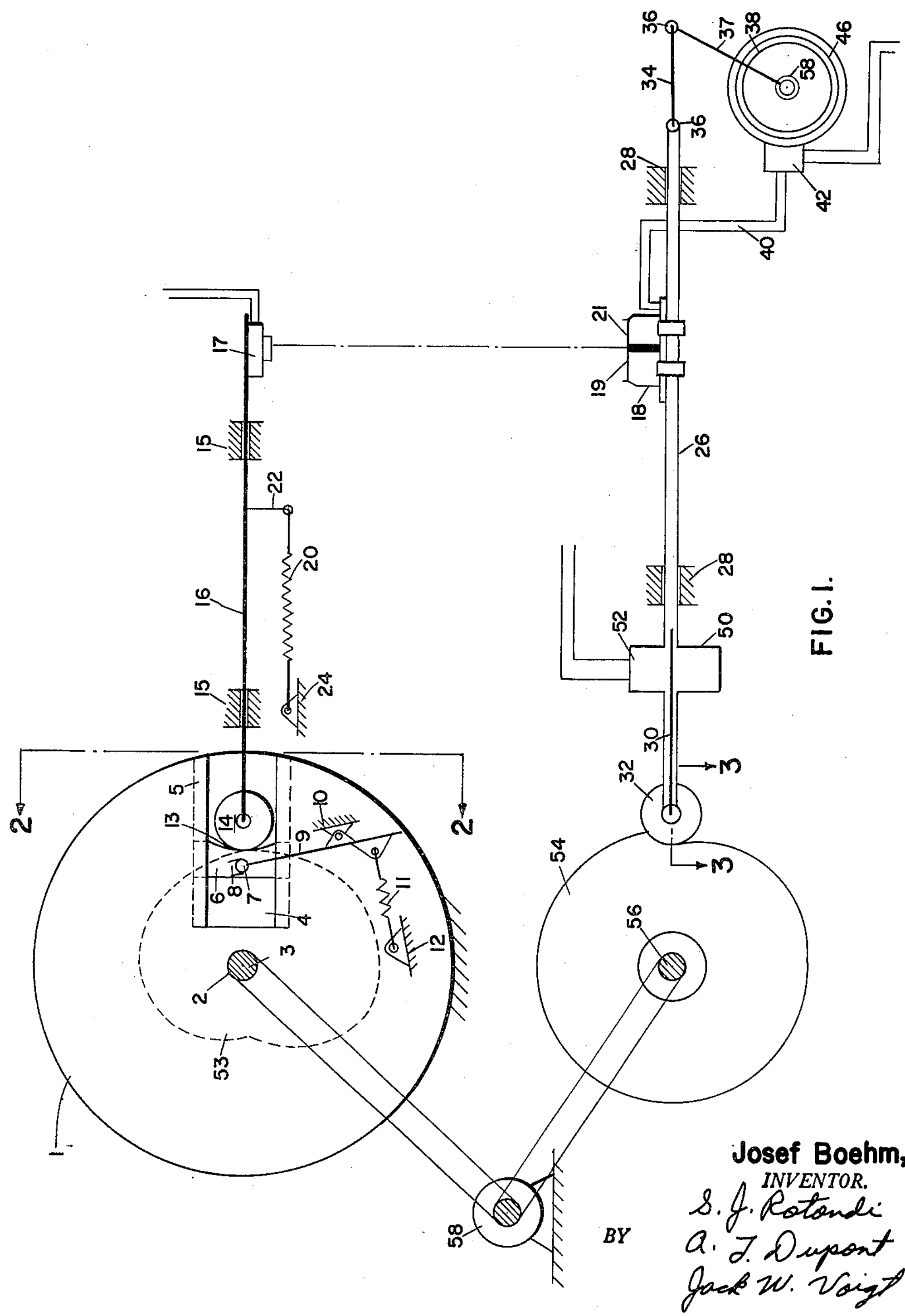
Josef Boehm,
INVENTOR.
BY S. J. Rotondi
A. T. Dupont
Jack W. Voigt

CAM PRODUCING APPARATUS

Filed Oct. 14, 1960 2 Sheets-Sheet 2

Josef Boehm,
INVENTOR.
BY S. J. Rotondi
A. J. Dupont
Jack N. Voigt

United States Patent Office 3,106,868

Patented Oct. 15, 1963

3,106,868

CAM PRODUCING APPARATUS

Josef Boehm, Huntsville, Ala., assignor to the United States of America as represented by the Secretary of the Army Filed Oct. 14, 1960, Ser. No. 62,809
6 Claims. (Cl. 90—13)
(Granted under Title 35, U.S. Code (1952), sec. 266)

This invention described herein may be manufactured and used by or for the Government for governmental purposes without the payment of any royalty thereon.

This invention relates to an apparatus for fabricating cams. Where precision cams are needed, such as in simulation apaparatus for guidance and control systems of missiles and aircraft and many other applications where functions are generated there is a need for a self-controlled device for producing cams. Also, there is a need for an apparatus which will cut production time and costs. There is a further need for an apparatus which will allow an operator to fabricate a cam without making complicated adjustments.

In view of these facts an object of this invention is to provide an apparatus which can be used to better produce precision cams.

Another object of this invention is to provide an apparatus which is simple to operate, so as to allow a reduction in fabrication time and production costs.

Another object of this invention is to provide an apparatus which will enable remanufacture of prior styles of cams without making complicated adjustments to the apparatus.

The foregoing and other objects of this invention will become more fully apparent from the following detailed description and from the accompanying drawings in which:

FIGURE 1 is an elevational view of the invention.

Figure 5:
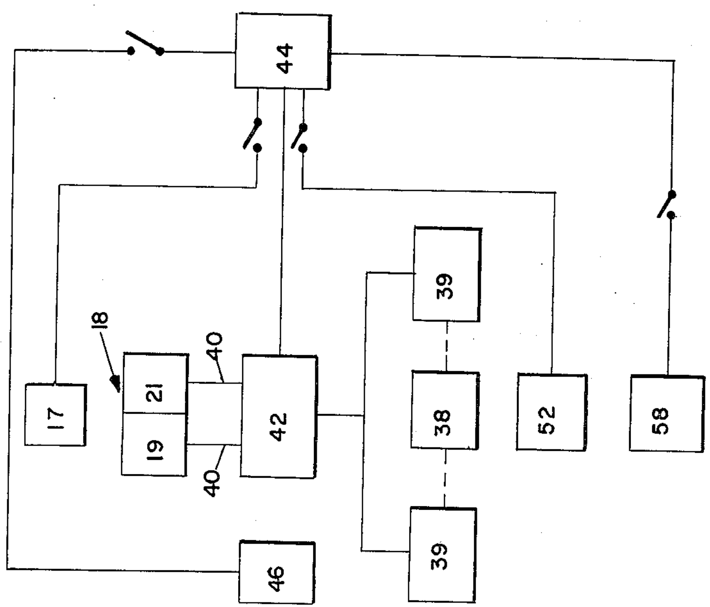
FIGURE 5 is a diagrammatic view showing how the cell is electrically connected to the switching arrangement, the reversible direction controlling device, the motor for operating the device, the solenoids, with their mechanical connections to the deivce shown dotted, and the power supply.

In the drawings, wherein for the purpose of illustration there is shown a preferred embodiment of the invention, the numeral 1 designates a pair of spaced, stationary circular plates which are provided with axial apertures 2 adapted to freely receive a shaft 3.

Each of the plates has a cut out portion 4, which is provided with a track 5. These tracks are adapted to slidably receive, in spaced relation, slides 6. Each of the slides has an arc 13 formed in its surface facing the periphery of plates 1 and a pin 7 attached to said slides, normal to said plates, which is received by the forked ends 8 of a pair of arms 9. Each of the arms is pivotably attached, intermediate its ends, to a stationary mount 10. The other ends of each arm 9 is attached to a separate spring 11. The other ends of each spring 11 is secured to a separate stationary mount 12.

Pins 7, pivoted arms 9, and springs 11 supply a continuous pressure on slides 6, so as to bias the arced sides of slides 6 in a direction toward the periphery of plates 1.

Arcs 13 are adapted to receive a follower roller 14 having a shaft thru its center which is rotatably journaled to the forked end of a rod 16. The center axis of the roller shaft is disposed in the same plane as the center axis of shaft 3, and the roller shaft's center axis is in alignment with the center of arcs 13. Rod 16 is slidably secured in a pair of stationary supports 15 intermediate its ends. Supports 15 are designed to prevent rotational movement of rod 16, but to allow longitudinal movement of rod 16. The other end of rod 16 provides a support for a light source 17 which coacts with a photoelectric cell assembly 18 comprising a first section 19 and a second section 21. A constant force, which is greater than and in opposition to the combined force from springs 11, is applied to rod 16 by a biasing spring 20. This spring has one end connected to one end of a rod 22, whose other end is integrally connected to rod 16. The other end of spring 20 is connected to a stationary member 24.

Figure 3:
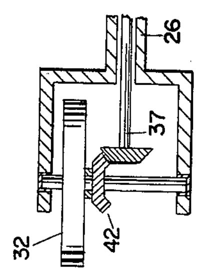
FIGURE 3 is a plane view along lines 3—3 of FIGURE 1 showing how the cam forming tool is connected to the movable housing.
Figure 4:
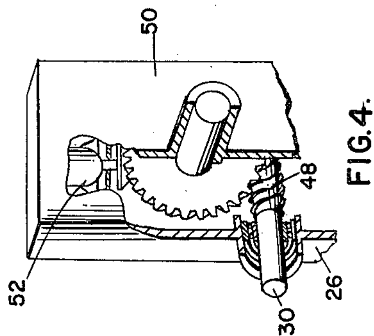
FIGURE 4 is a view, partly broken away, showing the connection between the tool driving shaft and the gears in the gear box.
Figure 2:
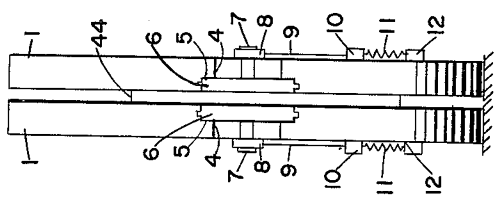
FIGURE 2 is a view along lines 2—2 of FIGURE 1.

Photo cell assembly 18 is mounted beneath the light source, on a sectional housing 26. The housing is journaled for longitudinal movement, in supports 28 and encloses a rotatable shaft 30. This shaft is retained in housing 26 by any suitable means, such as a snap ring. One end of housing 26 is substantially Y-shaped (FIGURE 3) and provides a support for a cutting tool 32. The other end of the housing is connected, by means of a rod 34 and a pair of joints 36, to an output arm 37 of a motion transmission or reversible direction controlling device 38, such as the device disclosed in my patent, No. 2,950,624. This motion transmission or direction controlling device is powered by a motor 46, which is continually operated when the switch connecting it to power supply 44 is closed.

Figure 6:
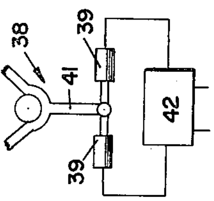
FIGURE 6 is a view, partly broken away, showing the shifting lever for the reversible direction controlling device and the ball and socket connection to the solenoids.

The two-way photo cell assembly is electrically connected, by conductors 40, to a switching arrangement 42. This switching arrangement controls the direction of the rotational output of device 38, thru solenoids 39, and the power supply 44. Solenoids 39 are secured to a shifting lever 41 as shown in FIGURE 6.

In order to rotate cutting tool 32, shaft 30 is provided with a gear section 48 which is journaled in a variable gear box 50. This gear box is secured between the sections of housing 26 by welding or other suitable means. The gears in box 50 are meshed with the output gear of a drive motor 52 which is integrally connected to box 50. However, tool 32 can be rotated by other means, such as a flexible shaft substituted for shaft 30. This would allow motor 52 and gear box 50 to be removed from housing 26, thereby reducing weight applied to the end of the shaft. When the apparatus is used in mass production of cams, tool supporting housing 26 can be provided with an oscillatory motion of a predetermined amplitude and cycle. This motion would not be sufficient to be visible on the surface being shaped, but would vary the force applied by the tool against the surface being shaped. Also, the apparatus can be arranged with the template and work blank parallel and retained on a common shaft.

The operation of the apparatus is as follows:

A template 53 is secured on rotatable shaft 3 between plates 1. Slides 6 are checked to insure that the template extends between them and engages follower 14.

When follower 14 is in position, the cam blank 54 is secured on rotatable shaft 56 so as to abut cam forming tool 32. The variable gear box is then checked to insure that the proper speed has been selected for the cam material and the tool. Photoelectric cell 18, which is adjustable along the longitudinal length of housing 26, is moved until its center is in alignment with light source 17.

With the proper speed setting obtained and the light source and cell aligned, the power for operation of motors 46 and 52 and a common motor 58 for rotating template 53 and cam material 54, at the same rotational speed, is switched on.

As template 53 rotates, follower 14 moves along its surface due to spring 20 being stronger than springs 11. Any variation in contour of template 53 causes a linear movement of rod 16 and light source 17.

Movement of light source 17, in a direction opposite from template 53, actuates section 21 of the photoelectric cell assembly, which supplies power for operating switching arrangement 42. The switching arrangement, when operated by assembly 18, connects power supply 44 to one of the solenoids 39. The solenoid actuated (which depends on the direction of movement of light source 17) moves lever 41, which controls the output direction of device 38, until device 38 provides output arm 37 with clockwise rotation (in this example).

This rotation supplies longitudinal movement to housing 26; gear box 50, motor 52 and shaft 30, thereby moving tool 32 in a direction away from blank 54. This movement continues until power to switching arrangement 42 is turned off by the center of photoelectric cell assembly 18 moving into alignment with light source 17. It is to be understood that realignment of cell 18 and light source 17 is instantaneous (except when heavy cams are being produced and light source 17 moves toward template 53) when arm 37 is rotated clockwise. When light source 17 moves toward template 53 the operation is the same, but section 19 of cell 18 supplies power to a second section of switching arrangement 42. This actuation connects power supply 44 to the other solenoid. This solenoid provides a movement of lever 41, opposite from the movement provided by the other solenoid, which changes the direction of the rotational output of arm 37. This direction of arm 37 is now counter-clockwise and the operation is the same as before if blank 54 is light material and easily formed. However, if a heavy cam is being produced, roller 14 will have to traverse template 53 more than one time before the template's contour is reproduced and the light source and cell are aligned. To insure that the apparatus is not damaged, when the output arm is rotated counter clockwise, arm 37 is connected to device 38 thru a suitable slip clutch 58. In operation the clutch enables motor 46 to maintain a force on tool 32; without stalling motor 46, when light source 17 and cell 18 cannot be instantaneously aligned.

This type of arrangement enables accurate production and reproduction of cams without complicated adjustments or readjustments of the apparatus.

It is to be understood that the form of the invention, herein shown and described, is to be taken as the preferred embodiment, and that various changes in the shape, size and arrangement of parts may be resorted to, without departing from the spirit of the invention, or the scope of the subjoined claims.

I claim:

1. A cam producing apparatus comprising: a rotatable shaft; a template secured to said rotatable shaft; a pair of plates each mounted on opposite sides of said template for protecting said template; each of said plates having a slot therein and being further provided with a central aperture to freely fit said rotatable shaft; tracks mounted in each of said slots; a rotatable cam follower, abutting said template, for following the contour of said template; means biased toward said template and having one end supporting said rotatable cam follower for transferring movement of said rotatable cam follower; a pair of spaced slides positioned on said tracks for slidable movement and disposed for engagement with said cam follower, said slides being biased in opposition to said means for supporting said cam follower to prevent excessive pressure from being exerted on the template by said cam follower; a light source secured to the other end of said means for transferring movement of said rotatable means; light sensing means, adjustably disposed in alignment with said light source; a slidable housing having said light sensing means attached intermediate its ends; a shaping tool secured to one end of said housing; means secured to said housing for driving said tool; motion transmission means connected to the other end of said housing for supplying bidirectional longitudinal movement to said housing; drive means connected to said motion transmission means for supplying power thereto; a work holding shaft having its axis disposed in the same plane as the axis of said tool; a cam blank secured to said work holding shaft; drive means, operably connected to said rotatable shaft and said work holding shaft, for rotating said shafts at the same rotational speed; and a source of power electrically connected to said means for driving said tool, said drive means for said rotatable shaft and said work holding shaft, said drive means for supplying power to said motion transmission means and to said light source.

2. A device as set forth in claim 1, in which said means for transferring movement of said cam follower comprises a biased rod journaled for longitudinal movement in a pair of stationary mounts, having said cam follower journaled to one end.

3. A device as set forth in claim 1, in which said light source comprises a device for producing a directed light beam.

4. A device as set forth in claim 1, in which said light sensing means comprises a photoelectric cell assembly controlled by said light source and adjustable along the longitudinal length of said housing for supporting said light sensing means.

5. A device as set forth in claim 1, in which said motion transmission means for supplying bidirectional movement to said housing comprises a device having a reversible output arm connected to said housing and controlled by movement of said light source.

6. Apparatus for shaping a workpiece from a master template comprising: a frame disposed for aligning said template, said frame provided with a shaft for rotational support of said template; a follower mounted for linear displacement and in biased engagement with said template to trace the contour of said template responsive to rotation of said template; a workpiece operatively connected to said shaft for simultaneous rotation with said shaft; a cutting tool mounted for linear displacement with said follower for cutting engagement with said workpiece; a source of light carried by said follower for movement with said follower; a control circuit carried by said cutting tool including a pair of photoelectric cells, each cell respectively disposed for energization by said light source to provide the linear movement to said cutting tool; and biasing means slidably carried by said frame for biased engagement with said follower to maintain a contact pressure between the follower and template which will not distort the template.

References Cited in the file of this patent

UNITED STATES PATENTS

| | | |
|---|---|---|
| 2,116,593 | Bouvier et al. | May 10, 1938 |

FOREIGN PATENTS

| | | |
|---|---|---|
| 692,809 | Great Britain | June 17, 1953 |